United States Patent [19]

Jutand et al.

[11] Patent Number: 4,947,446
[45] Date of Patent: Aug. 7, 1990

[54] METHOD AND CIRCUIT FOR FILTERING SIGNALS REPRESENTATIVE OF A PICTURE

[75] Inventors: Francis Jutand, Cachan; Alain Artieri, Meylan, both of France

[73] Assignee: Etat Francais représenté par le Ministre des Postes, Télécommunications et de l'Espace (Centre National d'Etudes des Telecommunications), Issy Les Moulineaux, France

[21] Appl. No.: 435,282

[22] Filed: Nov. 8, 1989

[30] Foreign Application Priority Data

Nov. 9, 1988 [FR] France .................... 88 14661

[51] Int. Cl.$^5$ .................................................. G06K 9/00
[52] U.S. Cl. ........................................ 382/54; 382/27; 364/724.05; 364/724.12
[58] Field of Search ...................... 382/54, 27, 49; 364/724.05, 725.12

[56] References Cited

U.S. PATENT DOCUMENTS 3,872,290  3/1975  Crooke et al. ............... 364/724.12
4,644,488  2/1987  Nathan ........................... 382/49

Primary Examiner—Leo H. Boudreau
Assistant Examiner—Daniel Santos
Attorney, Agent, or Firm—Fleit, Jacobson, Cohn, Price, Holman & Stern

[57] ABSTRACT

For filtering a bi-dimensional image signal in the form of data representing pixels obtained by column per column scanning of bands each having a height equal to a fraction of the height of the image, the transform of each pixel is computed in turn. For that, a convolution product using MxN coefficients is carried out on the pixels of a zone of an image, each column of each M pixels. The image is fractionated into mutually adjacent blocks each representing N columns of M pixels and the transforms of all pixels of a same block are simultaneously computed in MxN cycles by: parallel computation, during a same cycle, of all partial convolution products of only one of the filtering coefficients and of those pixels which provide a partial product which intervenes in the computation of the transforms of all pixels of the block, within a "window" of the picture which contains the block. The cycle is repeated for each coefficient in turn. All partial products obtained during the successive cycles are summed.

9 Claims, 5 Drawing Sheets

FIG. 5A $Y_{0,0} \times X_{0,0}$    $Y_{0,1} \times X_{0,0}$ $Y_{1,0} \times X_{0,0}$    $Y_{1,1} \times X_{0,0}$

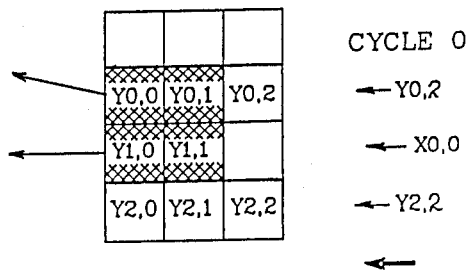

CYCLE 0

← $Y_{0,2}$

← $X_{0,0}$

← $Y_{2,2}$

←

FIG. 5B $Y_{1,0} \times X_{1,0}$         $Y_{1,1} \times X_{1,0}$
$+ Y_{0,0} \times X_{0,0}$    $+ Y_{0,1} \times X_{0,0}$ $Y_{2,0} \times X_{1,0}$         $Y_{2,1} \times X_{1,0}$
$+ Y_{1,0} \times X_{0,0}$    $+ Y_{1,1} \times X_{1,0}$

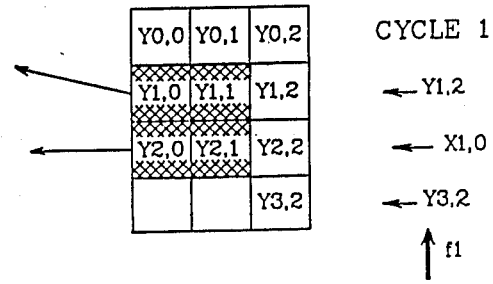

CYCLE 1

← $Y_{1,2}$

← $X_{1,0}$

← $Y_{3,2}$

↑ f1

FIG. 5C $Y_{1,1} \times X_{1,1}$         $Y_{1,2} \times X_{1,1}$
$+ Y_{1,0} \times X_{1,0}$    $+ Y_{1,1} \times X_{1,0}$
$+ Y_{0,0} \times X_{0,0}$    $+ Y_{0,1} \times X_{0,0}$ $Y_{2,1} \times X_{1,1}$         $Y_{2,2} \times X_{1,1}$
$+ Y_{2,0} \times X_{1,0}$    $+ Y_{2,1} \times X_{1,0}$
$+ Y_{1,0} \times X_{0,0}$    $+ Y_{1,1} \times X_{1,0}$

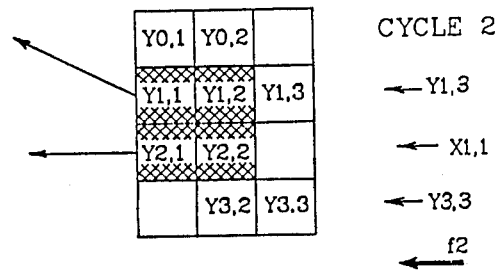

CYCLE 2

← $Y_{1,3}$

← $X_{1,1}$

← $Y_{3,3}$

← f2

FIG. 5D $Y_{0,1} \times X_{0,1}$         $Y_{0,2} \times X_{0,1}$
$+ Y_{1,1} \times X_{1,1}$    $+ Y_{1,2} \times X_{1,1}$
$+ Y_{1,0} \times X_{1,0}$    $+ Y_{1,1} \times X_{1,0}$
$+ Y_{0,0} \times X_{0,0}$    $+ Y_{0,1} \times X_{0,0}$ $Y_{1,1} \times X_{0,1}$         $Y_{1,2} \times X_{0,1}$
$+ Y_{2,1} \times X_{1,1}$    $+ Y_{2,2} \times X_{1,1}$
$+ Y_{2,0} \times X_{1,0}$    $+ Y_{2,1} \times X_{1,0}$
$+ Y_{1,0} \times X_{0,0}$    $+ Y_{1,1} \times X_{1,0}$

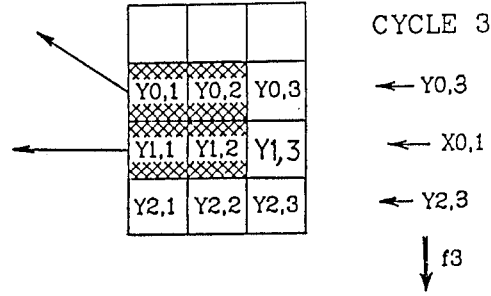

CYCLE 3

← $Y_{0,3}$

← $X_{0,1}$

← $Y_{2,3}$

↓ f3

METHOD AND CIRCUIT FOR FILTERING SIGNALS REPRESENTATIVE OF A PICTURE

BACKGROUND OF THE INVENTION

1. Field of the Invention

The invention relates to the filtering of picture representation signals, the term "picture signal" being taken in a very general sense and as designating any signal representing data having a two dimensional distribution, which will be considered hereafter for the sake of simplicity as designating a feature (for example luminance, contrast or chrominance) of a picture pixel.

The invention has an important an application in the field of installations for real time picture processing, which often require convolution filtering operations.

2. Prior Art

Numerous picture filtering devices already exist in the form of large scale integrated circuits. One of the major problems met with in the construction of such devices is the high number of pins required for feeding the filtering coefficients into the circuit, when the size of the convolution kernel is high. In fact, the usual devices carry out in parallel, on each pixel in turn, all the partial products required for the matrix multiplication by lines and/or columns of the matrix of the convolution kernel.

Attempts have been made to solve that problem, for instance by modifying the sequence of mathematical manipulations, as described for instance in Chambers U.S. Pat. No. 4,720,871 but with limited results.

SUMMARY OF THE INVENTION

An object of the invention is to provide an improved method for digital filtering signals represetative of an image and a device for implementing if it is a more specific object to reduce the complexity for real time computation and the number of pins required from the implementing circuit.

In accordance with the invention, there is provided a two-dimensional picture signal filtering method in which the transform of each pixel is determined by carrying out an MxN coefficient convolution product on the pixels of a picture zone having N columns with M pixels each, said picture zone containing the pixel whose transform is to be determined, The picture is represented by pixels obtained by scanning columns of "bands" each having a height equal to an entire fraction of the picture; the picture is cut up into adjacent blocks each representing N columns of M pixels each; and the transforms of all the pixels of a same block are determined simultaneously in MxN cycles by: parallel computation, during the same cycle, of all the partial convolution products of a single one of the filtering coefficients of a convolution kernel and of the data of all pixels providing a partial product necessary for computation of the transforms of all pixels of the block, in a "window" of the picture containing the block, the cycle being repeated for each coefficient in turn; and summation of the partial products obtained at each cycle, for each pixel, said determination being repeated on each of the blocks.

The pixels which are required and are sufficient for determining the transforms for all the pixels of the block are contained in a window of 2*N−1 columns of 2*M−1 pixels including the block.

The invention also provides a filtering circuit suitable for implementing the above-defined method. With the block having N columns of M pixels, the circuit comprises:

a matrix array of M lines each with N processors, first means for distributing a convolution coefficient of a convolution kernel to all the processors during a same cycle and for replacing the coefficient by another when passing from one cycle to the next, until MxN cycles have been carried out, second means for applying to each process, during successive cycles, data representative of pixels of a window whose offset with respect to the position of the coefficient distributed during the cycle remains unchanged, the array of processors being provided for computing MxN partial convolution products of one coefficient during a cycle and for summing, progressively during the successive cycles, the partial convolution products for all the coefficients of the block and for storing the value resulting from the summation.

It can be seen that the filtering coefficients applied to the different pixels are distributed each in turn, but each time to all computation channels. On the other hand, the pixels of the window of the picture containing all the pixels required for the computation of the transforms of the pixels of the process block circulate between the channels and the sums of the partial convolution products for the same pixel are at a fixed position in the channels.

BRIEF DESCRIPTION OF THE DRAWINGS

The invention will be better understood from the following description of a particular embodiment, given by way of a non-limitative example. The description refers to the accompanying drawings, in which:

FIG. 5A, 5B, 5C and 5D are diagrams showing the successive cycles of a filtering sequence;

DETAILED DESCRIPTION OF THE INVENTION

Before a particular embodiment of the invention is described, it may be useful to recall the principle of convolution filtering although a description thereof may be found in numerous documents, including Chambers U.S. Pat. No. 4,720,871 to which reference may be had.

Figure 1:
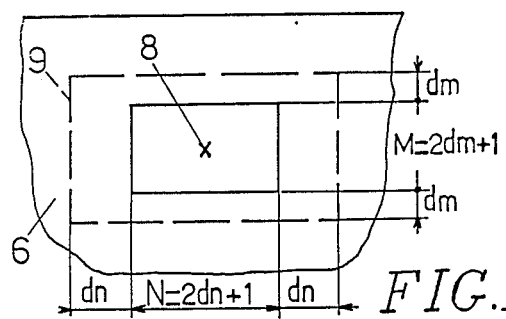
FIG. 1 is a diagram showing the relation between a block of coefficients forming a convolution kernel and a fraction of the picture to be filtered in the case where M and N are odd numbers.

Convolution filtering is achieved, for each pixel of the picture to be filtered, by summing the partial products each obtained by multiplying a data characteristic of a pixel of the picture (the original pixel or an adjacent piel), in a zone containing the pixel whose transform is being computed by a coefficient belonging to a convolution kernel. As shown in FIG. 1, it may be considered that, for a given pixel 8 of a picture 6, obtaining the transform involves all pixels belonging to N columns each of M pixels in a "picturette" centered on pixel 8, when the convolution kernel has MxN coefficients.

According to an aspect of the invention, the transform of the original pixel is not computed by simultaneously forming all the partial convolution products corresponding to this original pixel, so in one computation cycle; on the contrary, the respective contribution of one only of the coefficients to the sum of the convolution products is computed during a cycle for all the pixels of the picturette. In other words, during the same cycle all the partial products involving the same convolution coefficient x will be computed simultaneously. With $M=2dm+1$ and $N=2dn+1$ (dm and dn being integers), it may be arbitrarily assumed that the pixel of a set in a window 9 forming, about the picturette, a halo of width dn and height dm—and no other pixel—are involved in the computation of the transforms of the picturette shown with continuous lines in FIG. 1.

That leads to fractionating the picture 6 into mutually adjacent picturettes, which will be successively processed in sequence. Along the edge of the picture, a fraction of the window 9 will not be available and the absent pixels will be replaced by predetermined fixed values for computing the transforms.

It will be assumed hereafter, for sake of simplification, that each term of the convolution product consists of a straight multiplication of the respective weighting coefficient of the kernel by the value of the pixel to which the coefficient is applied.

Figure 2:
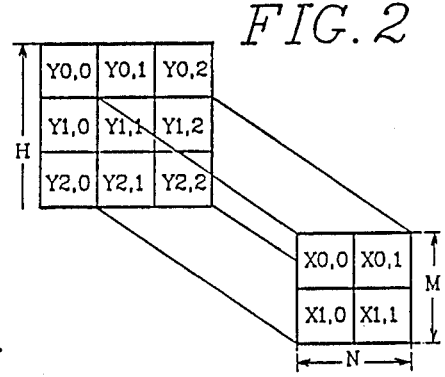
FIG. 2 is a diagram showing four coefficients forming a convolution kernel and the picture fraction (which will be hereinafter called "picturette") on which filtering is carried out in a single sequence and whose size corresponds to that of the block, and all the pixels manipulated during the sequence.

In FIG. 2, for the sake of simplification, $M=N=2$ has been represented. In the case illustrated in which $H=2M-$ and $L=2N-1$ and $M=N=2$, each picturette comprises four pixels and the convolution kernel has four coefficients $x0,0; \ldots; x1,1; H=L=3$, namely each window comprises nine pixels $y0,0, \ldots, y2,2$. In this case, $M*N=4$ partial products must be computed. The computation of each transform involves $N*M$ multiplications and $N*M$ summations, which corresponds to $2(NM)^2$ operations per picturette. Since, in real time, the coefficients of the kernel are transmitted one by one in $N*M$ cycles, it is necessary to have a computation circuit for carrying out $2N*M$ operations per cycle, namely a computing power proportional to the size $M*N$ of the block.

In accordance with the invention, the computations corresponding to all the possible locations corresponding to different offsets of the kernel $M*N$ in the window are carried out in parallel for the same kernel coefficient x; only the number of computing cycles depends on the size of the block, namely the convolution kernel.

Raster scanning is usely used for transmitting television images and more generally images analyzed point by point: each complete line is scanned in turn, a line blanking interval being provided between two successive lines. The method of the invention uses a different scanning method, which may be called "block scanning per column", which appreciably simplifies the architecture of the computing circuits.

Figure 3:
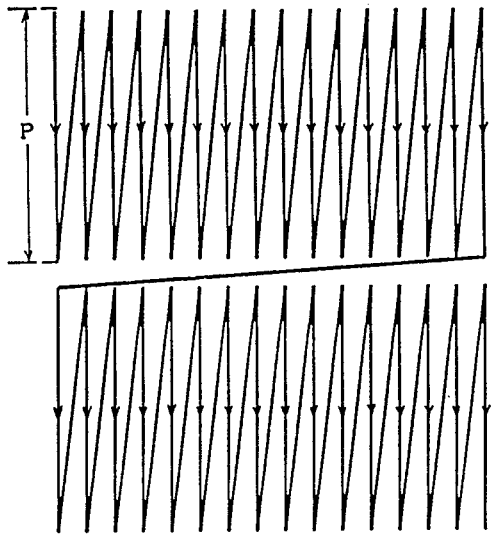
FIG. 3 is a diagram of "column per column" block scanning which can be used for implementing the invention.

FIG. 3 shows a first example of such a scanning which has the advantage of conditioning the block size M only. The image is scanned by successive bands whose height is a whole fraction of the height of the image and is equal to the height of a block.

There is no need to describe an apparatus for providing a digital representation of an image as pixels whose succession is in accordance with the scanning sequence of FIG. 3, since it may consist of a conventional raster scan device which digitizes the successive pixels, an addressable image memory and means for reading out the memory in accordance with the required scanning.

Figure 4:
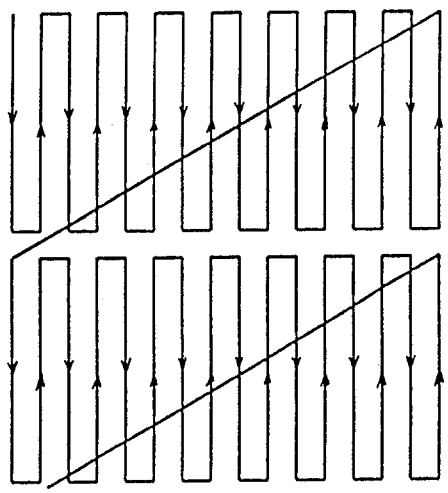
FIG. 4, similar to FIG. 3, shows a method of block scanning "column per column" forming a modification of that of FIG. 1 and particularly well adapted for implementing the invention.
Figure 6:
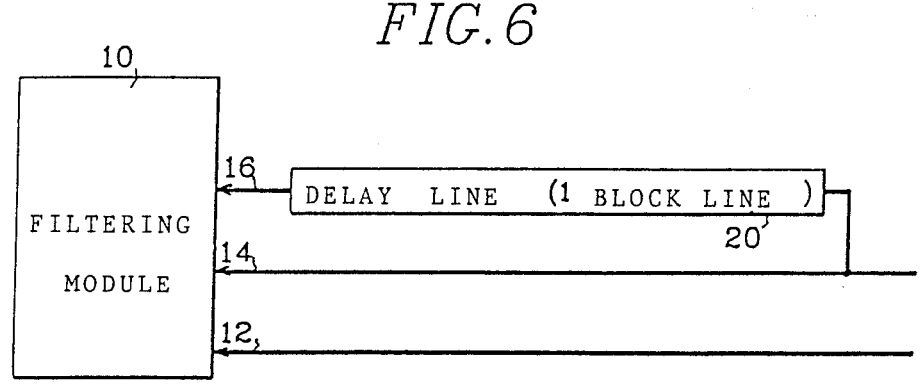
FIG. 6 is a diagram showing a method of using delay lines for applying the signals required for a filtering circuit.

FIG. 4 shows a modification of block scanning by columns which is even more avantageous than the preceding one. However transformation from one scanning method to another may be achieved in a very simple way, using a register with a sufficient capacity for containing one column of the block. If line-by-line transmission of the image takes place with conventional raster scanning, an input conversion, before picture processing properly speaking, may be carried out using a memory with a capacity equal to P lines of the picture, P being the band height for block scan.

For greater clarity, description of the implementation of the method of the invention will first be described when limited to a situation where the blocks (then kernels) and windows are of the kind shown in FIG. 2. Generalization of the method is immediate, the number of computation channels being in all cases equal to the number of possible shifts or offsets whereas the number of cycles in an elementary sequence of the method, for each block, is in all cases equal to 2M, whatever the value of N, the elementary sequence being repeated as many times as required until M*N cycles have been carried out.

FIGS. 5A to 5D illustrate respectively the computing cycles 0, 1, 2 and 3. During each cycle, four computations are carried out in parallel, for determining the partial product for all the possible associations, but on only one of the coefficients x,0,0; x0,1; x1,0; x1,1 at a time and all the appropriate pixels in the window (FIG. 2). At each cycle, all the channels receive coefficient $x_{m,n}$ (with $m\epsilon(0,1)$ and $n\epsilon(0,1)$) and all the channels operate in parallel, each computing a partial product $(x_{m,n}*,y_{m+i,n+j})$, corresponding to one coefficient of the kernel.

The only operations required on the pixels of the window are then shift operations (by one position upwards, one position downwards and one position leftwards). The arithmetical operations are limited to multiplications and summations only; and it will be seen that delivery of the data defining the pixels of the window involves no complication of the inputs, that favorable result being obtained due to the nature of the scanning.

In the example shown in FIGS. 5A to 5D, the operations carried out during the four cycles are as follows.

Cycle 0 (FIG. 5A)

The coefficient x0,0 is distributed to all the computing channels in parallel relation, which will each be implemented by a processor. Each of the channels computes and stores a product $(x_{0,0}, y_{i,j})$ relative to the position $(i,j)$ which is associated with the computing channel (where $0 \leq i \leq 2$ and $0 \leq j \leq 2$).

The left hand part of FIG. 5A shows the four results which appear simultaneously and are the terms or interim results for the coefficient $y0,0; \ldots; y1,1$ and the coefficient $x0,0$.

Cycle 1 (FIG. 5B)

During cycle 1, the nine products $(x_{1,0}, y_{1+i,j})$ are computed in parallel. For that, each of the computing channels must receive data representative of the pixel of the window situated immediately below the one which was used during cycle 0. In other words, it is necessary to shift all the pixels of the window by one position upwardly, as shown by arrow f1, before computing the terms corresponding to the four possibilities.

During the same cycle 1, the computed partial product corresponding to the offset is added to that of cycle 0 by summation, as is shown in the left hand part of FIG. 5B.

Cycle 2 (FIG. 5C)

Cycle 2 corresponds to computation of all partial products for the coefficient x1,1: each processor therefore computes one of the products $(x_{1,1}, y_{1+i,1+j})$. For that purpose, all points of the window are shifted by one position leftwards (arrow f2) before the partial products are computed and summed with the preceding products (left hand part of FIG. 5C).

Cycle 3 (FIG. 5D)

During cycle 3, the same computation is carried out as in cycle 2 but on x0,1, which requires shifting all the points of the window by one position downwardly (arrow f3). Each partial product computed is added to the corresponding partial or interim result for each of the possible transforms; consequently the sum of the partial products is obtained for the whole of the convolution kernel corresponding to each of the four possible transforms.

The operations shown in FIGS. 5A to 5D are advantageously carried out using a circuit comprising a matrix array of 2*2 processors each forming a channel and each capable of storing the data representative of one pixel of the window and the result of the computation corresponding to an offset; and additional registers for storing pixels of the window delivered during each cycle, which are not used for the computation during this cycle, but during the next computation cycle.

If the hatched portions on FIGS. 5A to 5D are considered as representing the processors required, it can be seen that the data transfers outside the initialization periods, are as follows:

At the beginning of cycle 0, the data y0,0 to y1,1 are already available in the processors from the preceding sequence of cycles; x0,0 is distributed to all processors; y0,2 and y2,2 are applied to the inputs of the matrix array and stored in input registers.

At the beginning of cycle 1, the data x1,0 is distributed to all processors; the data y1,2 and y3,2 are introduced into the input registers: these input registers then contain the whole of the following column of the window, i.e. all pixels of a column in the window. The content y of the processors is offset by one position upwardly (arrow f1).

During cycle 2, the data x1,1 is distributed to all the processors and the pixels are shifted in the window by one position leftwardly (arrow f2). At the same time, the data y1,3 and y3,3 are introduced into the corresponding input registers.

Finally, during cycle 3, in which the data x0,1 is distributed and the window is shifted downwardly (arrow f3), the data y0,3 and y2,3 are introduced: thus those data y which are required for beginning the cycle sequence corresponding to the following block of the picture are available.

A circuit will now be described forming a possible implementation of the method which has just been described, assuming that the adopted scanning method is the modified column per column scanning shown schematically in FIG. 4. It will be further assumed that the blocks have a size M*N and the window containing all the pixels required for the computations of the M*N transforms has a size H*L with $H=2M-N$ and $L=2N-1$.

Two inputs are required for delivering the pixels of the window.

The filtering module 10 then receives at an input 12 the values X of the coefficients of the kernel. For processing the blocks defined by bands B and C of the picture (FIG. 7), the pixels of bands B and C of the picture should be available to the filtering module 10. For that, the two inputs 14 and 16 of the filtering module 10 respectively receive the picture signals of the band of blocks C immediately below the band of blocks B and the picture signals of the band of blocks B obtained through a delay line 20 having the capacity required for storing one band of blocks. To sum up, inputs 14 and 16 correspond to the same pixels with a time offset of one band of blocks.

Figure 7:
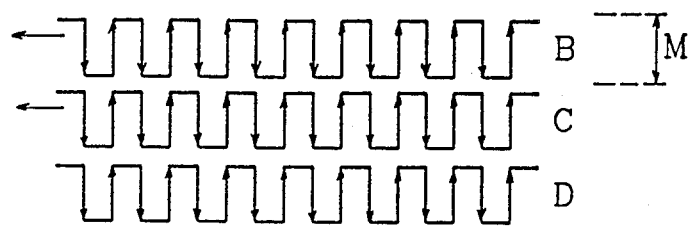
FIG. 7 shows a possible picture scanning method, in the case where H=3M.

After the blocks defined by bands B and C have been processed, processing of the blocks defined by bands C and D may begin: then the pixels of the bands of blocks C and D of the picture are delivered to module 10 (FIG. 7).

The core of the filtering module 10 is formed as a matrix array of M lines each having N processors each for computing a transform by filtering. The position occupied by the processor in the matrix array corresponds to the location of the transform in the filtered picturette, so of the concerned block in the window.

Figure 8:
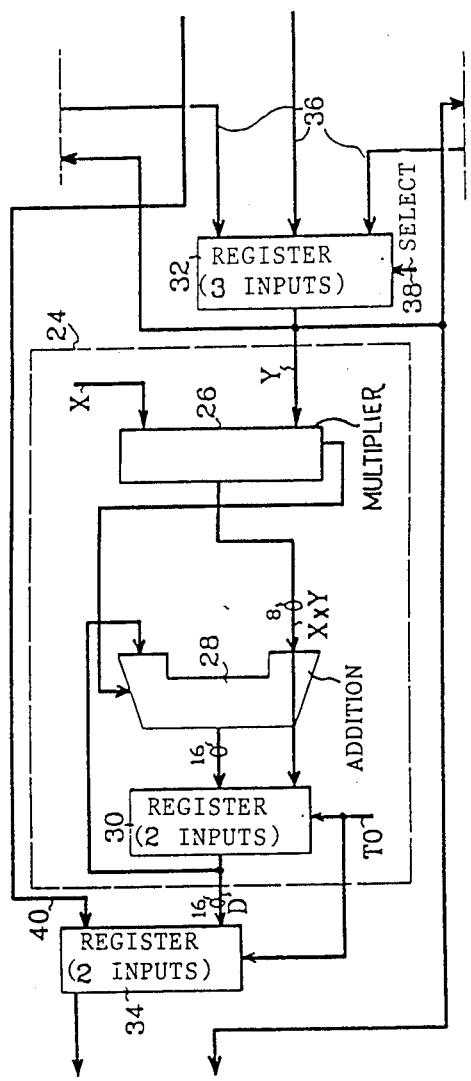
FIG. 8 is a block diagram of a basic processor for forming a computation matrix.

Each of the processors of module 10 may be constructed as shown schematically in FIG. 8 in the case where each partial product is of the form X*Y. X is a coefficient common to all processors, delivered by a common input, and Y is a local data specific to each processor. The processor may be regarded as comprising a multiplier circuit 24, an input register 32 and an output register 34.

The multiplier circuit 24 comprises a multiplier 26 which receives the common coefficient X and the local data Y and delivers X*Y to one of the inputs of an accumulator formed of an adder 28 and a register 30. The second input of the adder receives data feed back from the output of register 30. The output of the adder and X*Y are respectively applied to the two inputs of register 30 which sums the partial convolution products. The output of the register being re-applied to the input of adder 28, the sum of the products appears at the output of register 30 at the end of all the computing cycles. An initialization input T0 makes it possible to reset the accumulator after each block processing operation.

The input register 32 makes it possible to recover a new data Y originating either from the processor placed above in the matrix array, or from the processor placed below, or from the processor placed at right. For that, it comprises three inputs 36 and a selection input 38.

The output register 34 stores either the sum of the products contained in the accumulator formed of adder 28 and of register 30 of the multiplier circuit 24 (the transfer taking place during the initialization cycle of the accumulator responsive to signal T0), or the contents of the output register of processor 24 situated at the right of the processor considered. For that, the register 34 has an input receiving the sum of the products (namely the transform), an input 40 receiving the contents of the register from the processor situated at the right and a control input receiving the synchronization signal To.

It is in particular possible to use data encoded on eight bits, the components of the accumulator then being provided for processing sixteen bit words.

Figure 9:
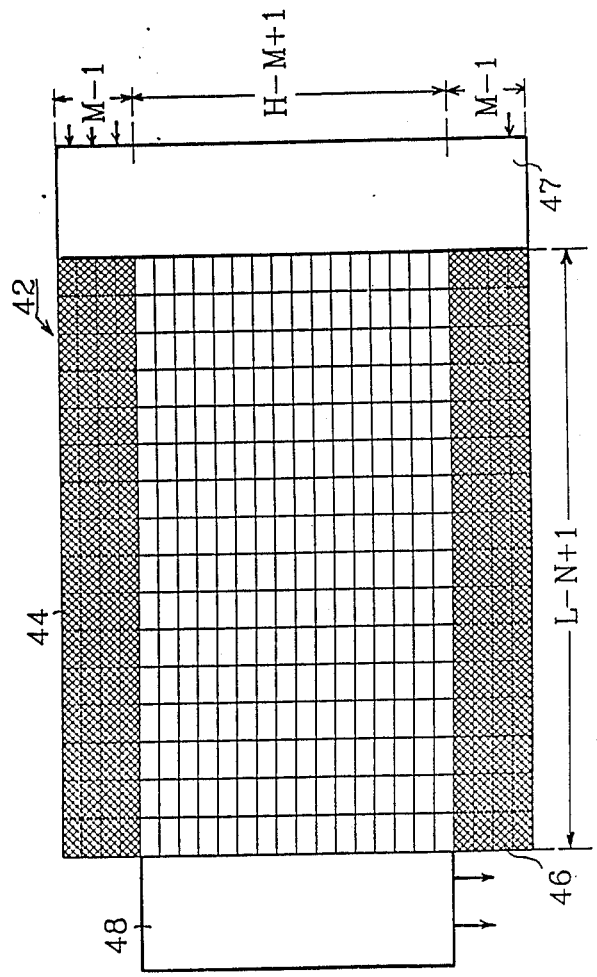
FIG. 9 shows the general construction of a device according to the invention.

The filtering module 10 shown in FIG. 9 comprises, in addition to the matrix array of M*N processors, two groups 44 and 46 of additional registers. The additional registers are provided for receiving the points of the window which are outside the matrix array of processors when a vertical shift takes place: it is then necessary to have $(H-M)=M-1$ lines each having N three input registers, organized in the same way as the input registers 32 of the matrix array of processors.

Figure 10:
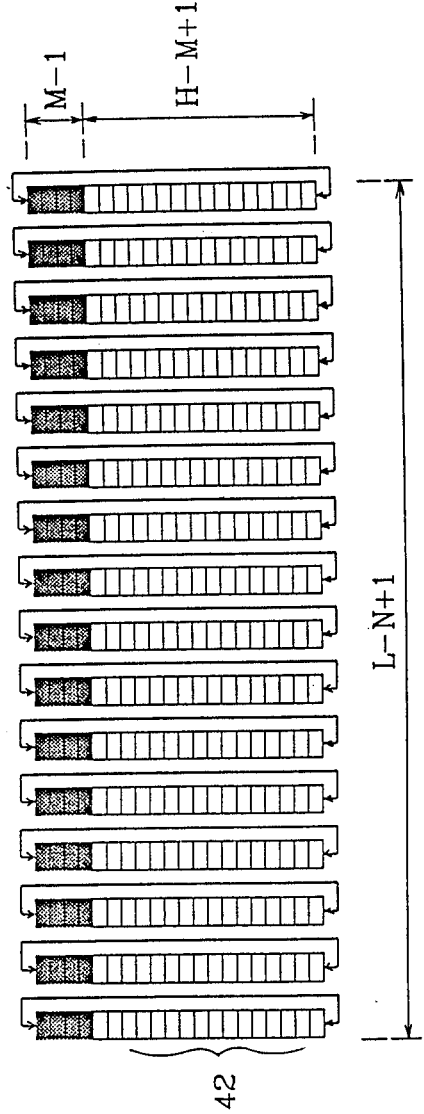
FIG. 10 shows a possible modified construction.

In FIG. 9, the additional registers are grouped into $M-1$ lines of registers above the processors and $M-1$ lines of registers below the processors. Another solution, more favorable as regards the number of additional registers required, is shown in FIG. 10. It consists in using only the number of additional registers strictly required (shown with hatching) with feed back through the processor matrix array 42. But this solution requires a greater transparency of the processor matrix array.

Finally, the module comprises a general input register 47, at the right of the processor matrix array and a storage shift register 48 at the left of the matrix array, in the case of the above-considered shifts and offsets. Register 48 has a structure such that in a single cycle M data delivered in parallel may be written in and that it may be read out in M cycles.

The general input register operates in the same way as registers 32.

Sequencing of the different components of the processing circuit described above is quite simple, since four synchronization signals are sufficient, used directly or combined with the general clock signal of the circuit, delivered by a local clock (not shown).

Figure 11:
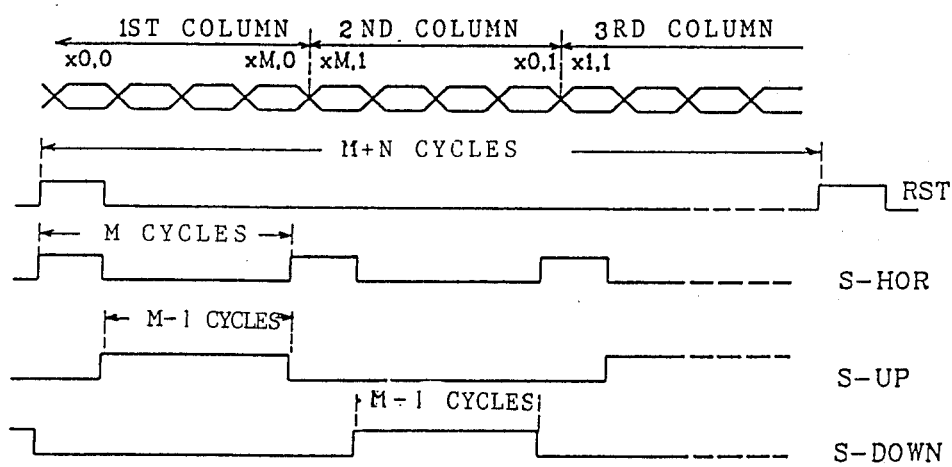
FIG. 11 is a time diagram of the primary sequencing signals of the device.

FIG. 11 shows the time distribution of the four signals with respect to the clock signal, shown on the upper line.

The reset signal RST indicates the beginning of computation process: it causes transfer of the results of the computation already carried out for the preceding block. It is therefore equivalent to the signal $T_0$ shown in FIG. 8.

The horizontal shift-to-left signal S-HOR controls the horizontal shift leftwards of all points of the window as a whole and causes the shifts during cycles 0 and 2 of the example. This signal indicates therefore the beginning of the process of a new column and is in phase with the processing of the first pixel of the column.

The vertical upward shift signal S-UP causes the shifts required during $M-1$ cycles for carrying out the computations corresponding to the $M-1$ pixels remaining in a column run through from top to bottom.

The vertical downward shift signal S-DOWN plays an identical role for a column run through from bottom to top.

The signals S-UP for upward shift and S-DOWN for downward shift of the points of the window occur alternately, each with a duration of $M-1$ cycles.

The elementary sequence of 2M cycles therefore consists, in that order, of a horizontal shift cycle activated by S-HOR followed by $M-1$ cycles of upward shifts enabled by S-UP followed by a horizontal shift cycle enabled by S-HOR followed by $M-1$ cycles of downward shifts enabled by S-DOWN.

We claim:

1. Process for two-dimensional filtering of data signals representative of pixels of a two-dimensional picture by convolution by a convolution kernel having MxN coefficient, M and N being predetermined integers, comprising the steps of:
   (a) scanning a picture to be processed column per column in successive horizontal bands each having a height equal to an entire fraction of the height of the picture, whereby a representation of the picture as pixels distributed in rows and columns is obtained, each band having a common predetermined number of rows,
   (b) fractionating said picture into mutually adjacent blocks of pixels each having M pixels in each of N mutually adjacent columns, and
   (c) computing the transforms of all pixels in a same block in MxN computing cycles by:
   computing in parallel, during a same computing cycle, all partial convolution products of a single one of the MxN coefficients of the convolution kernel and of the data of all of those pixels which provide a partial product necessary for computation of the transforms of all pixels of the block, in a window of the picture containing the block, the cycle being repeated for each coefficient in turn; and
   summing all the partial products obtained at each cycle, for each pixel of the respective block, and
   (d) repeating step (c) on each of the remaining blocks.

2. Process according to claim 1, wherein, during step (a), the picture is scanned in bands having M pixels per column.

3. Circuit for two-dimensional convolution filtering with a convolution kernel having MxN coefficients, M and N being integers greater than 1, of data representative of pixels of a two-dimensional picture, comprising:
   scanning means for scanning a picture to be processed, column per column, in successive horizontal bands each having a height equal to an entire fraction of the picture, whereby a representation of the picture as pixels distributed in rows and columns is obtained, all bands having a same predetermined number of rows,
   a matrix array of MxN processors distributed in M rows of N processors,
   first means for distributing one convolution coefficient of the convolution kernel at a time to all the processors during a same computing cycle and for replacing the coefficient with another coefficient when passing from one cycle to the next, until MxN successive cycles have been carried out, and
   second means for applying to each processor, during each of MxN successive cycles, data representative of a set of pixels of a window of the picture which includes the block, the pixels of said set having an offset with respect to the position of the coefficient distributed during the cycle which remains unchanged for each cycle, said array of processors being arranged for computing MxN partial convolution products of one coefficient of the kernel during a same cycle and for summing, progressively during the MxN successive cycles, the partial convolution products for all the coefficients of the kernel and for storing the value resulting from the summation.

4. Circuit according to claim 3, wherein the second means are arranged to simultaneously shift all data representing pixels of the picture through the array along such a path that each of said processors has summed all partial products necessary for computation of a predetermined one of said transforms on the respective block at the end of MxN cycles.

5. Circuit according to claim 4, wherein each of said processors comprises a circuit for computing a transform of one pixel and an input register connected to receive data representative of different pixels having different positions with respect to the pixel being transformed and to deliver the appropriate one of said pixels to an input of the circuit for computing the transform.

6. Circuit according to claim 5, wherein each of said processors further comprises an output register for selection between the output of said transform computing circuit and the output of the input register.

7. Circuit according to claim 5, wherein said input register of said processor has inputs connected to receive data respectively from the processors placed above, under, and at the right of said one processor in the array.

8. Circuit according to claim 5, wherein the tranform computing circuit comprises a multiplier for computing one partial product and accumulator means receiving the output of said multiplier.

9. Circuit according to claim 8, wherein the second means further comprise a general register connected to the input of said array of processors and having two inputs, one of said inputs being connected to directly receive pixel-representing data corresponding to the block to be processed while the other input receives pixel-representing data through a delay line providing a time delay corresponding to the scanning duration of a band of blocks.

* * * * *